April 18, 1967  W. J. CRAVEN  3,314,456
RECIPROCATING SAW BLADE WITH BURNISHING EDGE
Filed Dec. 10, 1963

INVENTOR.
WILBUR J. CRAVEN

BY Lindsey, Prutzman and Hayes
ATTORNEYS

United States Patent Office 3,314,456
Patented Apr. 18, 1967

3,314,456
RECIPROCATING SAW BLADE WITH
BURNISHING EDGE
Wilbur J. Craven, Glastonbury, Conn., assignor to The
Capewell Manufacturing Company, Hartford, Conn., a
corporation of Connecticut
Filed Dec. 10, 1963, Ser. No. 329,463
3 Claims. (Cl. 143—133)

This invention generally relates to cutting blades and especially to new and improved saw blades suitable for use with reciprocating saber saws and method and apparatus for making the same.

One of the objects of the present invention is to provide an improved saw blade exhibiting an unusually high capability to withstand flexures which are normally encountered in use.

A further object of the present invention is to provide an improved saw blade that is smoothly and efficiently operable while requiring a minimum of input power for the associated saw. Included in this object is the provision of such a blade which also burnishes the cut surface of the workpiece to provide a smooth finish, free of the jagged or burred edges that usually result from a saw cut.

A still further object of the present invention is to provide such an improved saw blade which is capable of cutting scroll cuts of unusually short radius.

A still further object of the present invention is to provide an improved saw blade that will obtain the above objects while at the same time being economical to manufacture.

Other objects will be in part obvious and in part pointed out more in detail hereinafter.

The invention accordingly consists in the features of construction, combination of elements and arrangement of parts which will be exemplified in the construction hereafter set forth, and the scope of the application of which will be indicated in the appended claims.

Figure 1:
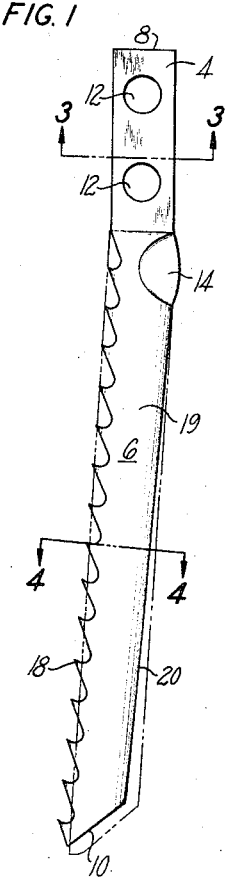
FIG. 1 is a side view of a saw blade constructed in accordance with the present invention including portions in phantom to illustrate one aspect of this invention.
Figure 3:
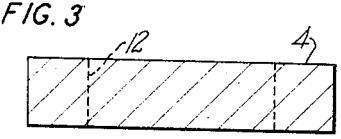
FIG. 3 is an enlarged cross-sectional view of the blade taken along lines 3—3 of FIG. 1.

Referring to the drawings in detail, FIG. 1 shows a saw blade constructed in accordance with the present invention and comprising a flat shank portion 4 and a cutting portion 6 extending from the shank portion 4. The upper end of the blade at the shank portion 4 is shown as having a straight edge 8 extending at a right angle to the longitudinal axis of the shank while the forward or leading end of the blade is shown as having a straight edge 10 extending at an angle of say about 45° to the longitudinal axis of the cutting portion 6. The shank portion 4 of the blade has a rectangular cross section as shown in FIG. 3 and is illustrated as being provided with a pair of apertures 12 by means of which the blade may be attached to a power saw (not shown) for reciprocation in the usual manner.

Figure 2:
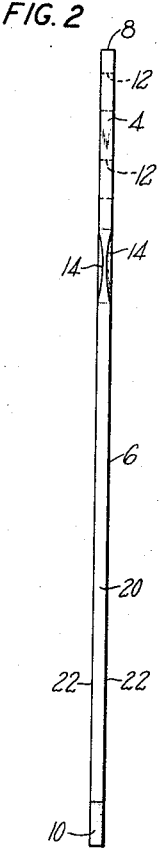
FIG. 2 is a top view of the blade of FIG. 1.

As shown in FIGS. 1 and 2, the cutting portion 6 of the blade has a greater width than the shank portion 4 and is formed at an angle with respect to the shank portion 4, this angle being preferably 3 to 5 degrees but may be varied from 1 to about 10 degrees. Work-hardened depressions 14 are shown as being formed in the opposite sides of the blade generally at the juncture between the shank and cutting portions 4 and 6, respectively. The depressions 14 extend from a point intermediate the edges of the blade to the back edge thereof and provide a further increased width to the critical area of the blade situated adjacent the saw chuck thereby providing increased strength to this area of the blade. A more detailed description of the angular relationship between the shank and cutting portions 4 and 6 respectively of the blade, as well as the formation of the depressions 14 thereof may be found in my copending United States application Ser. No. 308,109 filed Sept. 11, 1963, now abandoned, and assigned to the assignee of the present invention.

Figure 4:
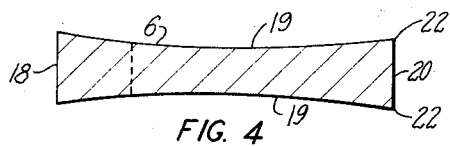
FIG. 4 is an enlarged cross-sectional view of the blade taken along lines 4—4 of FIG. 1.

In accordance with one aspect of the present invention, the cutting portion 6 of the blade is formed with a toothed cutting edge 18 and an untoothed noncutting edge 20 hereinafter referred to as a burnishing edge. Additionally, the cutting portion 6 of the blade is provided with concave side walls (see FIG. 4) formed by longitudinally rolling the cutting portion of the blade. The concave side walls 19 of the cutting portion 6 extend arcuately with a ⅞" radius continuously across the blade from the tips of the teeth 18 to the burnishing edge 20 and the concave side walls 19 meet the burnishing edge along a pair of longitudinally extending lines 22 (shown in FIGS. 2 and 4) with the cutting edge 18 and the burnishing edge 20 having the same thickness.

The longitudinal rolling of the blade causes the metal adjacent the surface of the finished blade to be placed under internal compression. Since breakage of the blade occurs when the metal thereof exceeds its elastic limit under tension, this longitudinal rolling increases the amount of lateral bending to which the blade can be subjected before fracture. In this connection, it will be understood that the initial lateral bending of one end of the blade relative to the other merely reduces the compressive forces on the metal adjacent the surface on the outside of the bend. Thus, tensile forces do not begin to build up to fracture level until after the blade has been bent laterally a sufficient amount to reduce the compressive forces in such surface portion of the metal to zero. In addition to this increased capacity to withstand flexure, the longitudinal rolling increases the flexibility of the blade about its longitudinal axis so that it can be used to produce small scroll cuts which in actual practice have been as small as ¼" in diameter. This increased flexibility of the blade stems from the decreased thickness at the center thereof together with the above-indicated compressive effects of the longitudinal rolling of the blade.

With a saw blade made according to this invention, there is substantially reduced contact between the blade and the workpiece in a cutting operation due to the untoothed burnishing edge 20 coupled with the concavity of the side walls 19 which fully extend across the blade to result substantially in line contact between the corners 22 and the workpiece. This feature minimizes the frictional and mechanical resistance to cutting, thereby permitting the operator to easily guide the blade while at the same time requiring a minimum of input power for the associated saw. At the same time, since burnishing edge 20 is the same thickness as the teeth, the line contact between the corners 22 and the cut surface of the workpiece will provide a burnishing action which will impart a smooth finish to the cut surface. Furthermore, if the side walls 19 of the blade cutting portion 6 should engage the workpiece, such as when a small scroll cut is being made, this will produce a minimum frictional load due to the increased flexibility about the longitudinal axis of the cutting portion of the blade imparted by the concave side walls 19 and the mirror finish thereof resulting from the longitudinal rolling of the cutting portion 6 of the saw blade.

It has been found that, with the surface portions of the cutting section 6 of the blade under internal compression due to the longitudinal rolling of the prehardened metal blade blank, the formation of the teeth 18 on only one of the edges in any conventional manner causes the cutting portion 6 to undergo a slight longitudinal curvature (as indicated by the departure of the finished blade shown in solid lines in FIG. 1 from the blade blank shown in phantom) due to the weakening of the cutting edge and the lengthening of the burnishing edge 20 relative thereto until the internal compressive stresses in the cutting portion of the blade are again in equilibrium. The curvature thus provided improves the cutting capability of the blade since it assures that each of the teeth engage the workpiece. Moreover, this longitudinal curvature, or arcing, of the cutting portion 6 either alone or in combination with its angular relationship of the cutting portion 6 relative to the shank portion 4 compensates for any wear that may occur in the reciprocating member of the associated power saw to which the shank portion 4 of the blade is attached.

As will be apparent to persons skilled in the art, various modifications and adaptations of the structure above described will become readily apparent without departure from the spirit and scope of the invention, the scope of which is defined in the appended claims.

I claim:

1. A saw blade comprising a shank portion of generally rectangular cross section having means for attaching the blade to a reciprocating member, a cutting portion having a toothed cutting edge and an untoothed noncutting burnishing edge extending longitudinally of the blade, said cutting and burnishing edges having the same thickness, and said cutting portion having a pair of longitudinally rolled concave side walls arcuately extending the full width of said cutting portion of the blade between the cutting and burnishing edges and meeting the burnishing edge along longitudinally extending lines.

2. The saw blade as defined in claim 1 wherein the width of the cutting portion of the blade is greater than that of the shank portion.

3. The saw blade as defined in claim 1 wherein the metal of the cutting portion of the blade adjacent the surface thereof is under internal compressive stress.

References Cited by the Examiner

UNITED STATES PATENTS

| 334,440 | 1/1886 | Ireland | 143—133 |
| 341,989 | 5/1886 | Atkins | 143—133 |
| 1,434,295 | 10/1922 | Lang. | |
| 2,954,808 | 10/1960 | Sweeney et al. | 143—133 XR |

FOREIGN PATENTS 1,126,700 7/1956 France.

DONALD R. SCHRAN, *Primary Examiner.*